(12) United States Patent
Tokumura et al.

(10) Patent No.: US 7,566,498 B2
(45) Date of Patent: Jul. 28, 2009

(54) THERMO-EXPANSIVE MICROCAPSULE, PRODUCTION PROCESS OF EXPANDED PRODUCT AND EXPANDED PRODUCT THEREOF

(75) Inventors: Sachiko Tokumura, Osaka (JP); Kenichi Kitano, Osaka (JP); Toshiaki Masuda, Osaka (JP); Katsushi Miki, Osaka (JP)

(73) Assignee: Matsumoto Yushi-Seiyaku Co., Ltd., Yao-shi (JP)

( * ) Notice: Subject to any disclaimer, the term of this patent is extended or adjusted under 35 U.S.C. 154(b) by 688 days.

(21) Appl. No.: 10/539,064

(22) PCT Filed: Dec. 24, 2003

(86) PCT No.: PCT/JP03/16577

§ 371 (c)(1),
(2), (4) Date: Jun. 15, 2005

(87) PCT Pub. No.: WO2004/058910

PCT Pub. Date: Jul. 15, 2004

(65) Prior Publication Data

US 2006/0063000 A1  Mar. 23, 2006

(30) Foreign Application Priority Data

Dec. 25, 2002 (JP) ............................ 2002-383674
Dec. 25, 2002 (JP) ............................ 2002-383675

(51) Int. Cl.
*B32B 5/16* (2006.01)

(52) U.S. Cl. .................. 428/402.22; 521/56; 428/402.2

(58) Field of Classification Search ............. 428/402.2, 428/402.22; 521/56
See application file for complete search history.

(56) References Cited

U.S. PATENT DOCUMENTS

| 3,615,972 A | 10/1971 | Morehouse, Jr. et al. |
| 6,235,394 B1 | 5/2001 | Shimazawa et al. |
| 6,235,800 B1 | 5/2001 | Kyuno et al. |

FOREIGN PATENT DOCUMENTS

| EP | 0 566 367 A2 | 10/1993 |
| EP | 0 994 124 A2 | 4/2000 |
| EP | 1 054 034 A1 | 11/2000 |
| EP | 1 059 339 A1 | 12/2000 |
| JP | 42-26524 | 12/1942 |
| JP | 59-01541 A | 1/1984 |
| JP | 59-138420 A | 8/1984 |
| JP | 63-15835 A | 1/1988 |
| JP | 7-275689 A | 10/1995 |
| JP | 09-019635 A | 1/1997 |
| JP | 9-234758 A | 9/1997 |
| JP | 10-152575 A | 6/1998 |
| JP | 2001-79916 A | 3/2001 |
| JP | 2002-226620 A | 8/2002 |
| WO | WO 99/43758 A1 | 9/1999 |
| WO | WO 99/46320 A1 | 9/1999 |

*Primary Examiner*—Kuo-Liang Peng
(74) *Attorney, Agent, or Firm*—Foley & Lardner LLP

(57) ABSTRACT

Thermo-expansive microcapsule comprising: a polymeric shell produced by polymerizing 15 to 75 weight % of a nitrile monomer, 10 to 65 weight % of a monomer having a carboxyl group, 0.1 to 20 weight % of a monomer having an amide group and 0.1 to 20 weight % of a monomer having a cyclic structure in its side chain; and a blowing agent encapsulated in the polymeric shell.

16 Claims, No Drawings

THERMO-EXPANSIVE MICROCAPSULE, PRODUCTION PROCESS OF EXPANDED PRODUCT AND EXPANDED PRODUCT THEREOF

FIELD OF INVENTION

The present invention relates to thermo-expansive microcapsules and their application, more particularly, to thermo-expansive microcapsules, which have superior resistance against heat and solvents and exhibit superior expanding performance in a temperature range of 200° C. and higher, the production process of foamed and molded product thereof, and the foamed and molded product.

TECHNICAL BACKGROUND

Various processes for producing thermo-expansive microcapsules, wherein thermoplastic polymer is used for microencapsulating a volatile expanding agent having a gasification point lower than the softening point of said polymer, have been studied. An overall process for producing thermo-expansive microcapsules is described in Japanese Patent Publication No. Sho 42-26524, and a process for producing thermo-expansive microcapsules having polymeric shell wall of uniform sickness is described in U.S. Pat. No. 3,615,972.

Although those processes can produce thermo-expansive microcapsules, they cannot produce thermo-expansive microcapsules sufficiently expansive in high temperature region of 200° C. and higher.

Japanese Patent Laid-Open No. Hei 9-19635 disclosed a production process of heat resistant thermo-expansive microcapsules, wherein 80% or more of an acrylonitrile monomer are employed for producing thermo-expansive microcapsules. Thermo-expansive microcapsules are usually applied to a process wherein the microcapsules are heated near to their maximum expanding temperature. The microcapsules produced with 80% or more of an acrylonitrile monomer have limited heat resistance, and do not exhibit sufficient expanding performance at 200° C. or higher.

WO99/46320 disclosed a production process for thermo-expansive microcapsules with acrylonitrile, N-substituted maleimide, a monomer of which homopolymer has a Tg (glass-transition point) from 50 to 200° C., and unsaturated carboxylic acid. In this method a preferable ratio of the unsaturated carboxylic acid is 5 weight percent or less and a ratio greater than 5 weight percent decreases the expanding performance of the resultant microcapsules.

WO99/43758 disclosed a production process of highly heat resistant microcapsules wherein the functional groups in shell wall material crosslink each other when the microcapsules are expanded with heat.

Although the process can provide highly heat-resistant microcapsules, the shell wall of the expanded microcapsules has properties of thermo-setting resin, i.e., poor elasticity and brittleness like glass, due to the crosslinking of the functional groups in the shell wall material during expanding with heat. For this reason, the microcapsules can only be applied under limited conditions and thus to limited end uses.

Recently, processes for producing foamed and molded products wherein thermo-expansive microcapsules are mixed in rubber or resin and expanded with heat in molding the mixture have been proposed. Those processes are advantageous for introducing discrete and uniform air bubbles in molded products easily, though it was difficult in the foaming with foaming chemicals.

For example, Japanese Patent Laid-Open No. Sho 59-1541 disclosed a processes for producing expansive rubber composition containing thermoplastic resin hollow particles in which a blowing agent is encapsulated; Japanese Patent Laid-Open No. Sho 59-138420 disclosed a process for producing expanded products by blending an expanding agent similar to microcapsules in rubber or plastics; and Japanese Patent Laid-Open No. Hei 10-152575 disclosed a process for producing foamed and molded products by blending thermo-expansive microcapsules in thermoplastic resin and processing the blend in extrusion or injection-molding. However, the foamed and molded products of expansive rubber or thermoplastic resin produced in accordance with the processes described in those patents shrink after the expansion of blended microcapsules and thus their weight is not satisfactorily reduced.

Japanese Patent Laid-Open No.2002-226620 disclosed a production process of light-weight molded products containing thermo-expansive microspheres of which polymeric shell wall contains 80 weight percent or more of a nitrile monomer. Even with the process, it is difficult to provide sufficiently expanded light-weight molded products when the products are processed at a temperature higher than the maximum expanding temperature of the thermo-expansive microspheres.

Recently there is an increasing demand for the development of more heat-resistant thermo-expansive microcapsules, which are applicable in various fields. In a process for producing highly foamed and molded products by blending thermo-expansive microcapsules with resin, thermo-expansive microcapsules having a maximum expanding temperature higher than the heating temperature of the resin is preferable for expanding the blend with heat to introduce discrete air bubbles in the resin.

Highly foamed molded products can be produced with the conventional thermo-expansive microcapsules in a process wherein thermoplastic resin blended with thermo-expansive microcapsules is heated at comparatively low temperature, 80 to 160° C. to form the blend. On the contrary, sufficiently foamed product cannot be produced with conventional thermo-expansive microcapsules in a process wherein thermoplastic resin, rubber, or thermoplastic elastomer is knead with microcapsules and processed at 150° C. or higher temperature, because of insufficient heat resistance of those conventional thermo-expansive microcapsules.

The inventors of the present invention have found through their investigation that thermo-expansive microcapsules having superior heat resistance can be produced by forming the shell wall of the capsules with polymer comprising a nitrile monomer and a monomer having a carboxyl group in its molecule.

Although the thermo-expansive microcapsules of which shell wall comprises with a nitrile monomer and a monomer having a carboxyl group in its molecule as major component are heat-resistant, they sometimes fail to expand enough depending on processing conditions, such as kneading into resins, etc.

With further investigation, the inventors found a production process for thermo-expansive microcapsules of the present invention, wherein a nitrile monomer, a monomer having a carboxyl group in its molecule, a monomer having an amide group in its molecule, and a monomer having a cyclic structure in its side chain are employed to produce thermo-expansive microcapsules having superior heat and solvent resistance and excellent expanding performance in broad temperature range in high temperature region, and applicable in foaming and molding thermoplastic resin and thermo-setting resin to be molded at 200° C. or higher temperature.

The microcapsules mentioned above rarely change their color in resins owing to their superior heat resistance to that of conventional thermo-expansive microcapsules, and contribute to producing foamed and molded products retaining high degree of whiteness even after processing at 200° C.

DISCLOSURE OF INVENTION

1. The present invention provides a thermo-expansive microcapsule comprising: a polymeric shell produced by polymerizing 15 to 75 weight % of a nitrile monomer, 10 to 65 weight % of a monomer having a carboxyl group, 0.1 to 20 weight % of a monomer having a amide group and 0.1 to 20 weight % of a monomer having a cyclic structure in its side chain; and a blowing agent encapsulated in the polymeric shell.

2. The polymeric shell of said thermo-expansive microcapsule is characterized by the monomer components further containing 3 weight % or less of a monomer which has two or more of polymerizable double bonds in its molecules (cross-linking agents).

3. The polymeric shell of said thermo-expansive microcapsule is characterized by having a glass-transition point (Tg) of 120° C. or higher.

4. The polymeric shell of said thermo-expansive microcapsule is characterized by containing 1 to 25 weight percent of inorganic substances.

5. Said thermo-expansive microcapsule is characterized by having a maximum expanding temperature of 200° C. or higher.

6. The production process of foamed and molded products wherein discrete air bubbles are introduced in the products by blending a thermo-expansive microcapsule with rubber or resin and by heating the blend to expand the microcapsule. The thermo-expansive microcapsule comprises a polymeric shell produced by polymerizing monomer components contaning 15 to 75 weight % of a nitrile monomer, 10 to 65 weight % of a monomer having a carboxyl group, 0.1 to 20 weight % of a monomer having an amide group and 0.1 to 20 weight % of a monomer having a cyclic structure in its side chain; and a blowing agent encapsulated in the polymeric shell. The thermo-expansive microcapsule's polymeric shell may be produced by polymerizing the monomer components further containing 3 weight % or less of a monomer having at least two polymerizable double bonds (a cross-linking agent). The thermo-expansive microcapsule's shell may have a glass transition point (Tg) of 120° C. or higher. The thermo-expansive microcapsule's polymeric shell may contain 1 to 25 weight % of inorganic compounds. The thermo-expansive microcapsule may have a maximum expanding temperature of 200° C. or higher.

7. The foamed and molded products containing the thermo-expansive microcapsule comprising a polymeric shell produced by polymerizing monomer components containing 15 to 75 weight % of a nitrile monomer, 10 to 65 weight % of a monomer having a carboxyl group, 0.1 to 20 weight % of a monomer having an amide group and 0.1 to 20 weight % of a monomer having a cyclic structure in its side chain; and a blowing agent encapsulated in the polymeric shell. The thermo-expansive microcapsule's polymeric shell may be produced by polymerizing the monomer components further containing 3 weight % or less of a monomer having at least two polymerizable double bonds (a cross-linking agent). The thermo-expansive microcapsule's shell may have a glass transition point (Tg) of 120° C. or higher. The thermo-expansive microcapsule's polymeric shell may contain 1 to 25 weight % of inorganic compounds. The thermo-expansive microcapsule may have a maximum expanding temperature of 200° C. or higher.

The thermo-expansive microcapsules of the present invention are characterized by polymeric shell wall which is formed with polymer comprising 15 to 75 weight percent of a nitrile monomer, 10 to 65 weight percent of a monomer having a carboxyl group, 0.1 to 20 weight percent of a monomer having an amide group, and 0.1 to 20 weight percent of a monomer having a cyclic structure in its side chain; and a blowing agent encapsulated in the shell wall. The polymeric shell wall preferably contains 1 to 25 weight percent of inorganic substances. The foamed and molded products of the present invention are characterized by containing said thermo-expansive microcapsules.

The nitrile monomers applicable to the present invention are, for example, acrylonitrile, methacrylonitrile, α-chloracrylonitrile, α-ethoxyacrylonitrile, fumaronitrile and the mixture of any combination of them, and the like. Among those, acrylonitrile and/or methacrylonitrile are preferable. The amount of the nitrile monomer may range from 15 to 75 weight percent, preferably from 25 to 65 weight percent, of the polymeric shell wall. Polymeric shell wall containing less than 15 weight percent of the nitrile monomer has poor performance as vapor barriers and cannot expand sufficiently.

The monomers having a carboxyl group are, for example, acrylic acid, methacrylic acid, itaconic acid, styrenesulfonic acid or its sodium salt, maleic acid, fumaric acid, citraconic acid, and the mixture of any combination of them, and the like. The amount of the monomer having a carboxyl group may range from 10 to 65 weight percent, preferably from 20 to 55 weight percent, of the polymeric shell wall. A polymeric shell wall containing less than 10 weight percent of the monomer having a carboxyl group cannot attain sufficient expansion of the resultant microcapsules at 200° C. or higher.

The monomers having an amide group are, for example, acryl amide, methacrylamide, N,N-dimethylacrylamide, and N,N-dimethylmethacrylamide. The preferable ratio of the monomer having an amide group ranges from 0.1 to 20 weight percent, more preferably from 1 to 10 weight percent of the polymeric shell wall. A proper expanding performance of microcapsules for each application can be attained by modifying the ratio of the monomer having an amide group within the range of the preferable ratio. Polymeric shell wall containing lower ratio of the monomer having an amide group results in microcapsules expanding narrower temperature region, while polymeric shell wall containing higher ratio of the monomer having an amide group results in microcapsules expanding broader temperature region. In other words, greater ratio of the monomer having an amide group in polymeric shell wall contributes to producing microcapsules having superior heat resistance.

The monomers having a cyclic structure in its side chain are, for example, styrene, α-methyl styrene, chlorostyrene, isobornyl (meth)acrylate, and cyclohexyl methacrylate. Phenyl maleimide and cyclohexyl maleimide, which are monomers having a cyclic structure in its principal chain and having a cyclic structure in its side chain, are also employed as the monomer having a cyclic structure in its side chain. Preferable ratio of the monomer having a cyclic structure in its side chain is 0.1 to 20 weight percent of polymeric shell wall, more preferably 1 to 10 weight percent. A proper expanding performance of microcapsules for each application can be attained by modifying the ratio of the monomer having a cyclic structure within the preferable range. Polymeric shell wall containing lower ratio of the monomer having a cyclic structure in its side chain results in microcapsules expanding narrower temperature region, while polymeric shell wall containing higher ratio of the monomer having a cyclic structure results in microcapsules expanding broader temperature region. In other words, polymeric shell wall containing greater ratio of the monomer having a cyclic structure in its side chain contributes to retaining the elasticity of expanded microcapsules in a wider temperature range.

Monomers having two or more of polymerizable double bonds in their molecules (cross-linking agents) can be optionally added to the shell polymer, though the microcapsules of the present invention can be produced without such cross-linking agents. The examples of the cross-linking agents are divinyl benzene, ethyleneglycol di(meth)acrylate, diethyleneglycol di(meth)acrylate, triethyleneglycol di(meth)acrylate, PEG (200) di(meth)acrylate, PEG (400) di(meth)acrylate, PEG (600) di(meth)acrylate, triacryl formal, trimethylolpropane trimethacrylate, aryl methacrylate, 1,3-butylglycol dimethacrylate, and triacryl isocyanate, though the applicable cross-linking agents are not restricted within the scope of those monomers. The preferable ratio of the cross-linking agents is 0 to 3 weight percent of the polymeric shell wall. The addition of the monomer having two or more of polymerizable double bonds widens the range of expanding temperature of resultant microcapsules.

The polymeric shell wall of the microcapsules is produced by blending a proper amount of a polymerization initiator to the components described above. The applicable polymerization initiators are the compounds known to those skilled in the art, such as peroxides and azo compounds. The examples of the polymerization initiators are azobisisobutylonitrile, benzoyl peroxide, lauryl peroxide, diisopropyl peroxidicarbonate, t-butyl peroxide, and 2,2'-azobis (2,4-dimethyl) valeronitrile, though the applicable polymerization initiators are not restricted within the scope of those substances. The preferable polymerization initiators are oil-soluble initiators which are soluble in the polymerizable monomer employed.

The preferable glass-transition point (Tg) of the polymer forming the shell wall of the thermo-expansive microcapsule is 120° C. or higher. The Tg of the polymer can be calculated from Tg of the homopolymer of each of monomers contained in the polymer, or can be determined with differential scanning calorimetry (DSC).

The blowing agents encapsulated in the microcapsules are those known to skilled in the art, which gasify below the softening point of the polymeric shell wall. The examples of such blowing agents are propane, propylene, butene, normal butane, isobutane, isopentane, neopentane, normal pentane, normal hexane, isohexane, heptane, octane, nonane, decane, petroleum ether, halogenated compounds of methane, low-boiling-point liquid such as tetraalkyl silane, and thermally degradable and gasifiable compounds such as AIBN. Those blowing agents are selected according to the desirable range of the expanding temperature of microcapsules. One of the blowing agents or two or more of them are employed.

Although fluorine compounds such as HCF, HCFC, HFC, and HFE, which are generally called flon, fluorocarbon, and fluoroether, are also included in the examples of the blowing agents mentioned above, they may not be used under the present situation where the destruction of ozone layer and the green-house effect of the earth are concerned.

For producing the thermo-expansive microcapsules of the present invention, conventional processes are usually employed. In those processes, inorganic particles such as silica, magnesium hydroxide, calcium phosphate and aluminum hydroxide, are applied as stabilizers for aqueous dispersion. In addition, condensation products of diethanolamine and aliphatic dicarboxylic acid, polyvinyl pyrolidone, methyl cellulose, polyethylene oxide, polyvinyl alcohol and various emulsifiers are applied as the auxiliaries for those stabilizers.

In conventional processes, inorganic dispersants remained on polymeric shell wall were assumed to be the cause of the agglomeration of dried microcapsules or poor dispersibility of microcapsules in medium, and studies were carried out to remove the remained inorganic dispersants.

However, the inventors of the present invention have found that inorganic dispersants remained on polymeric shell wall contribute to retaining the heat resistance of the thermo-expansive microcapsules of the present invention. In other words, it is estimated that inorganic dispersants remained on polymeric shell wall improve the heat resistance of microcapsules by forming outer layer of polymeric shell wall or by generating synergy with the polar groups of polymeric shell wall.

The preferable ratio of the inorganic dispersant in thermo-expansive microcapsules is 1 to 25 weight percent, more preferably 5 to 20 weight percent, for imparting heat resistance to thermo-expansive microcapsules and dispersing thermo-expansive microcapsules in resin.

For producing foamed and molded products, the proper ratio of said thermo-expansive microcapsules to rubber or resin ranges from 0.1 to 20 weight percent, preferably from 0.5 to 12 weight percent and more preferably from 1 to 6 weight percent.

The ratio of the thermo-expansive microcapsules should be adjusted according to the variants of molded products to be produced. For example, in the case of injection molding, a small ratio of said thermo-expansive microcapsules is effective for improving surface finish and preventing wrinkles on product surface, and greater quantity of said thermo-expansive microcapsules contributes to high foaming of molded products.

The proper mean diameter of said thermo-expansive microcapsules is about 1 to 500 μm, preferably about 3 to 100 μm, and more preferably 5 to 50 μm. Thermo-expansive microcapsules of excessively small mean diameter cannot foam the molded products enough and those of excessively large mean diameter produce large air bubbles which decrease the strength of the resultant foamed and molded products.

Thus an optimum particle diameter of microcapsules is selected according to the end uses of resultant products.

Said thermo-expansive microcapsules can be blended directly in rubber or resin, or can be blended in resin after mixed with thermoplastic resin and prepared into a master batch.

The applicable thermoplastic resins for mixing with the thermo-expansive microcapsules for preparing a master batch are polyorefins and their copolymers. For example, ethylene vynil acetate, ethylbuthyl acrylate, ethylmethyl acrylate, polyethylene, polypropylene, styrene block copolymer and thermo-plastic elastomer.

The processes for producing the foamed and molded products include conventional processes, such as calendering, extrusion, blow molding, injection molding, and internal cast molding.

The thermo-expansive microcapsules of the present invention have superior heat resistance and expand sufficiently at high temperature, such as 200° C. or higher temperature, and the expanded capsules are elastic. Thus the thermo-expansive microcapsules of the present invention can expand sufficiently in an admixture with rubber and resins, such as PE, PP, PS, and SBC, in the temperature region from 200° C. to higher, in which conventional thermo-expansive microcapsules cannot expand enough, to reduce the weight of molded products and to introduce discrete air bubbles in molded products. In addition, the present invention can provide thermo-expansive microcapsules exhibiting sufficient expanding performance at 250° C. or above, and are applicable to foaming engineering plastics, super-engineering plastics, and thermo-setting resins, which cannot be foamed enough with other foaming agents, such as organic or inorganic foaming agents.

BEST MODE OF EMBODIMENT

EXAMPLES

The present invention is described specifically with the following examples and comparative examples.

Example 1

An aqueous medium was prepared by adding 150 g of salt water, 3 g of an adipic acid-diethanolamine condensate, and 60 g of colloidal solution of hydrated alumina in 500 g of deionized water and by homogenizing the mixture with agitation.

An oily medium was prepared by mixing 120 g of acrylonitrile, 70 g of methacrylonitrile, 90 g of methacrylic acid, 10 g of methacrylamide, 10 g of styrene, 1 g of azobisisobutylonitrile, 40 g of isohexane, and 40 g of isooctane, and by dissolving the component with agitation.

Then the aqueous medium and oily medium were mixed and agitated in a homogenizer at 7000 rpm for 2 minutes to be prepared into suspension. Then the suspension was transferred in a reactor, purged with nitrogen, and reacted with agitation at 70° C. for 20 hours. The reacted product was filtered and dried.

The resultant microcapsules had a mean diameter about 15 µm and contained 12 weight percent of inorganic substances.

The thermo-expanding performance of the thermo-expansive microcapsules was analyzed with a TMA-7, a tester produced by Perkin-Elmer Co., Ltd., according to the procedure disclosed in Japanese Patent Laid-Open No. Hei 11-002615.

As a result, the thermo-expansive microcapsules exhibited an initial expanding temperature of 185° C. and a maximum expanding temperature of 230° C.

Example 2

An aqueous medium was prepared by adding 150 g of salt water, 3 g of adipic acid-diethanolamine condensate, and 40 g of colloidal solution of hydrolyzed alumina in 500 g of deionized water and by homogenizing the mixture with agitation.

An oily medium was prepared by mixing 120 g of acrylonitrile, 90 g of methacrylonitrile, 80 g of methacrylic acid, 5 g of methacrylamide, 5 g of styrene, 1 g of azobisisobutylonitrile, 40 g of isopentane, and 40 g of isooctane, and by dissolving the component with agitation.

Then the aqueous medium and oily medium were mixed and treated as in the same manner in Example 1.

The resultant microcapsules had a mean diameter about 30 µm, contained 7 weight percent of inorganic substances, and exhibited an initial expanding temperature of 160° C. and a maximum expanding temperature of 210° C.

Example 3

Thermo-expansive microcapsules were produced in the same manner as in Example 1, except that an oily medium was prepared by mixing 120 g of acrylonitrile, 60 g of methacrylonitrile, 70 g of methacrylic acid, 40 g of acrylic acid, 5 g of methacrylamide, 5 g of styrene, 1 g of azobisisobutylonitrile, 40 g of isohexane, and 40 g of isooctane, and by dissolving the component with agitation.

The resultant microcapsules had a mean diameter about 12 µm, contained 15 weight percent of inorganic substances, and exhibited an initial expanding temperature of 180° C. and a maximum expanding temperature of 220° C.

Example 4

Thermo-expansive microcapsules were produced in the same manner as in Example 1, except that an oily medium was prepared by mixing 120 g of acrylonitrile, 60 g of methacrylonitrile, 80 g of methacrylic acid, 20 g of acrylamide, 20 g of styrene, 1 g of azobisisobutylonitrile, 40 g of isopentane, and 40 g of isooctane, and by dissolving the component with agitation.

The resultant microcapsules had a mean diameter about 20 µm, contained 10 weight percent of inorganic substances, and exhibited an initial expanding temperature of 160° C. and a maximum expanding temperature of 210° C.

Example 5

Thermo-expansive microcapsules were produced in the same manner as in Example 1, except that an oily medium was prepared by mixing 100 g of acrylonitrile, 30 g of methacrylonitrile, 140 g of methacrylic acid, 15 g of methacrylamide, 15 g of styrene, 1 g of azobisisobutylonitrile, and 80 g of isooctane, and by dissolving the component with agitation.

The resultant microcapsules had a mean diameter about 18 µm, contained 10 weight percent of inorganic substances, and exhibited an initial expanding temperature of 210° C. and a maximum expanding temperature of 250° C.

Example 6

Thermo-expansive microcapsules were produced in the same manner as in Example 1, except that 0.5 g of ethyleneglycol dimethacrylate was added to the oily medium.

The resultant microcapsules had a mean diameter about 20 µm, contained 14 weight percent of inorganic substances, and exhibited an initial expanding temperature of 190° C. and a maximum expanding temperature of 235° C.

Example 7

Thermo-expansive microcapsules were produced in the same manner as in Example 1, except that the reaction was carried out at first at 70° C. for 7 hours and then at 90° C. for 13 hours.

The resultant microcapsules had a mean diameter about 20 µm, contained 15 weight percent of inorganic substances, and exhibited an initial expanding temperature of 190° C. and a maximum expanding temperature of 270° C.

Example 8

A foamed rubber sheet was produced by preparing a rubber sheet containing thermo-expansive microcapsules with biaxial rolls and by heating the sheet.

Two weight percent of the thermo-expansive microcapsules produced in the process described in Example 2 was wet with 2 weight percent of a process oil and mixed with 96 weight percent of styrene-butadiene-styrene block copolymer (SBS). The mixture was kneaded with biaxial rolls at 80 to 100° C. to be processed into a rubber sheet, and then heated with a hot pressing device at 170° C. for 10 minutes to be processed into foamed rubber sheet.

The foaming of the mixture in the kneading with biaxial rolls and the foaming in hot pressing were evaluated.

The result is shown in Table 1.

Comparative Example 1

A foamed rubber sheet was produced in the same manner as in Example 8 except that the thermo-expansive microcapsules-1 (consisting of polymeric shell wall of acrylonitrile and methacrylonitrile, having a mean diameter of about 30 µm, and exhibiting an initial expanding temperature of 120° C. and a maximum expanding temperature of 170° C.) were employed instead of the thermo-expansive microcapsules of Example 2.

The result is shown in Table 1.

TABLE 1

| Test No. | State of rubber sheet (*1) | Surface of rubber sheet (*2) | Specific gravity of foamed rubber sheet (g/cm³) |
|---|---|---|---|
| Example 8 | not expanded | good | 0.45 |
| Comparative Example 1 | expanded | poor | 0.60 |

(*1): Tested by inspecting the cross section of rubber sheets after kneading through scanning electron microscope (SEM) to check the existence of expanded microcapsules
(*2): Tested by visual inspection of the roughness of rubber sheet surface The results compared in Table 1 described above show that the thermo-expansive microcapsules of the present invention, of which polymeric shell wall has a Tg (glass transition temperature) of 120° C. or higher temperature, did not expand with the heat generated in the kneading with rubber in the production process of foamed rubber sheet, and contributed to satisfactory surface finish of the rubber sheet. The thermo-expansive microcapsules of the present invention sufficiently expanded in hot pressing to contribute to producing foamed rubber sheet of lower specific gravity and reduced weight.

Example 9

Foamed film sheet was produced with extruding.

A composition was prepared by mixing 96 weight percent of polyethylene (with a density of 0.91 g/cm³, and melt flow rate of 32 g/10 min at 190° C.), 3 weight percent of the thermo-expansive microcapsules produced in the process in Example 1, and 1 weight percent of an oil. The composition was processed into foamed film sheet with a T-die temperature controlled at 200 to 220° C. The result is shown in Table 2.

Comparative Example 2

Foamed film sheet was produced in the same manner as in Example 9 except that the thermo-expansive microcapsules-2 (consisting of polymeric shell wall of acrylonitrile, methacrylonitrile and methyl methacrylate, having a mean diameter of about 18 µm, and exhibiting an initial expanding temperature of 145° C. and a maximum expanding temperature of 155° C.) were applied instead of the thermo-expansive microcapsules of Example 1. The result is shown in Table 2.

TABLE 2

| Test No. | T-die temperature (° C.) | Expansion (%) | Sheet thickness (mm) | Color (b value) (*3) |
|---|---|---|---|---|
| Example 9 | 200 | 1.28 | 0.45 | 0.02 |
|  | 210 | 1.44 | 0.50 | 0.04 |
|  | 220 | 1.87 | 0.52 | 0.05 |
| Comparative Example 2 | 200 | 1.00 | 0.33 | 0.57 |
|  | 210 | 1.00 | 0.32 | 0.60 |
|  | 220 | 1.00 | 0.32 | 0.61 |

(*3): Determined with a spectral colorimeter CLR-7100F produced by SHIMADZU Co., Ltd. according to the Hunter system of color. The b values indicate yellowing of test specimens, and greater value represents deeper shade of yellow.

The results compared in Table 2 show that light-weight foamed film sheet was produced with the thermo-expansive microcapsules of the present invention. The resultant film sheet was white without color change.

On the other hand, the thermo-expansive microcapsules in the film sheets produced in Comparative Example 2 may have shrunk with the heat in the extruding process. Thus no foaming was observed in the sheets though they were colored.

Example 10

A composition described below was processed in injection-molding under a injection pressure of about 1000 kg/cm² with an injection molding machine with a clamping force of about 80 tons and 32 mm screw diameter.

A composition was prepared by mixing 97 weight percent of polypropylene (with a density of 0.9 g/cm³, and melt-flow rate of 14 g/10 min at 230° C.) and 3 weight percent of thermo-expansive microcapsules produced in the process of Example 6. The composition was processed in injection-molding at 190 to 250° C. to be formed into a disc-shaped products having 98 mm diameter and 3 mm thickness. The result is shown in Table 3.

Example 11

A composition was processed in the same manner as in Example 10 except that the thermo-expansive microcapsules produced in the process of Example 7 were employed instead of the thermo-expansive microcapsules produced in the process of Example 6. The result is show in Table 3.

Comparative Example 3

A composition was processed in the same manner as in Example 10 except that the thermo-expansive microcapsules-1 (consisting of polymeric shell wall of acrylonitrile and methacrylonitrile, having a mean diameter of about 30 µm, and exhibiting an initial expanding temperature of 120° C. and a maximum expanding temperature of 170° C.) were applied instead of the thermo-expansive microcapsules produced in the process of Example 6. The result is shown in Table 3.

Comparative Example 4

A composition was processed in the same manner as in Example 10 except that the thermo-expansive microcapsules-3 (consisting of polymeric shell wall of acrylonitrile, methacrylonitrile and methacrylic acid, having a mean diameter of about 30 µm, and exhibiting an initial expanding temperature of 160° C. and a maximum expanding temperature of 200° C.) were applied instead of the thermo-expansive microcapsules produced in the process of Example 6. The result is show in Table 3.

TABLE 3

| Test No. | Injection temperature (° C.) | Density (g/cm³) | Reduced weight (%) |
| --- | --- | --- | --- |
| Example 10 | 190 | 0.71 | 21 |
|  | 210 | 0.66 | 27 |
|  | 230 | 0.67 | 26 |
|  | 250 | 0.69 | 23 |
| Example 11 | 190 | 0.71 | 21 |
|  | 210 | 0.66 | 27 |
|  | 230 | 0.63 | 30 |
|  | 250 | 0.61 | 32 |
| Comparative Example 3 | 190 | 0.72 | 20 |
|  | 210 | 0.81 | 10 |
|  | 230 | 0.84 | 7 |
|  | 250 | 0.87 | 3 |
| Comparative Example 4 | 190 | 0.67 | 26 |
|  | 210 | 0.72 | 20 |
|  | 230 | 0.77 | 14 |
|  | 250 | 0.83 | 8 |

The results compared in Table 3 show that the foamed and molded products with the thermo-expansive microcapsules of the present invention resulted in satisfactory expanding in wide temperature range.

In other words, the production process for producing foamed and molded products of the present invention can constantly produce foamed and molded products with high foaming.

In addition, the foamed and molded products produced with the thermo-expansive microcapsules described in Comparative Examples resulted in smaller weight reduction in injection molding at higher temperature levels, of which cause was estimated to be the shrinkage of expanded microcapsules. Simultaneously color change was observed on those products. On the contrary, the foamed and molded products with the thermo-expansive microcapsules of the present invention resulted in sufficient foaming and slight color change.

Example 12

A composition was prepared by mixing 99 weight percent of polypropylene and 1 weight percent of thermo-expansive microcapsules produced in the process of Example 6, and processed in the same manner as in Example 10 except that the injection was carried out at 210° C.

Example 13

A composition was prepared by mixing 95 weight percent of polypropylene and 5 weight percent of thermo-expansive microcapsules produced in the process of Example 6, and processed in the same manner as in Example 10.

The results of Examples 10, 12, and 13 are compared in Table 4.

TABLE 4

| Test No. | Injection temperature (° C.) | Density (g/cm³) | Reduced weight (%) |
| --- | --- | --- | --- |
| Example 10 (PP & 3 wt. % of capsules) | 210 | 0.66 | 27 |
| Example 12 (PP & 1 wt. % of capsules) | 210 | 0.76 | 16 |
| Example 13 (PP & 5 wt. % of capsules) | 210 | 0.58 | 36 |

The comparative result in Table 4 shows that the weight reduction of resultant products can be controlled by changing the ratio of thermo-expansive microcapsules.

APPLICATION IN INDUSTRIAL FIELDS

The thermo-expansive microcapsules, production process for foamed and molded products, and foamed and molded products therefrom described in claims 1 to 7 provide thermo-expansive microcapsules which exhibit superior heat resistance and sufficient expanding performance at 200° C. or higher, and expand into elastic balloons. In addition, a mixture of the thermo-expansive microcapsules of the present invention and rubber or resin such as PE, PP, PS, and SBC, exhibits high foaming performance that were not attained by conventional thermo-expansive microcapsules, i.e., foaming sufficiently in heating at 200° C. or higher to introduce air bubbles in products and to reduce their weight. The present invention also provides thermo-expansive microcapsules having superior expanding performance in high temperature region, 250° C. or higher, and having a great possibility of the application in industrial fields owing to their applicability to foaming engineering plastics, super engineering plastics and thermo-setting resins, which could not be attained by other foaming agents, such as organic or inorganic foaming agents.

The invention claimed is:

1. A thermo-expansive microcapsule consisting essentially of: a polymeric shell produced by polymerizing monomer components consisting essentially of 15 to 75 weight % of a nitrile monomer, 10 to 65 weight % of a monomer having a carboxyl group, 0.1 to 20 weight % of a monomer having an amide group and 0.1 to 20 weight % of a monomer having a cyclic structure in its side chain; and a blowing agent encapsulated in the polymeric shell, wherein the monomer having an amide group is at least one selected from the group consisting of acryl amide, methacrylamide, N,N-dimethylacrylamide, and N,N-dimethylmethacrylamide.

2. The thermo-expansive microcapsule of claim 1, wherein the polymeric shell has a glass transition point (Tg) of 120° C. or higher.

3. The thermo-expansive microcapsule of claim 1, which has a maximum expanding temperature of 200° C. or higher.

4. A production process of a foamed and molded product which comprises adding the thermo-expansive microcapsule of claim 1 in rubber or resin to form a mixture and heating the mixture to expand the thermo-expansive microcapsule to introduce discrete air bubbles in the product.

5. A foamed and molded product containing the thermo-expansive microcapsule of claim 1.

6. The thermo-expansive microcapsule according to claim 1, wherein the monomer having a cyclic structure in its side chain is at least one selected from the group consisting of styrene, α-methyl styrene, chlorostyrene, isobornyl(meth) acrylate, cyclohexyl methacrylate, phenyl maleimide, and cyclohexyl maleimide.

7. The thermo-expansive microcapsule according to claim 1, wherein the nitrile monomer is at least one selected from the group consisting of acrylonitrile and methacrylonitrile.

8. A thermo-expansive microcapsule consisting essentially of: a polymeric shell produced by polymerizing monomer components consisting essentially of 15 to 75 weight % of a nitrile monomer, 10 to 65 weight % of a monomer having a carboxyl group, 0.1 to 20 weight % of a monomer having an amide group, 0.1 to 20 weight % of a monomer having a cyclic structure in its side chain and 3 weight % or less of a monomer having at least two polymerizable double bonds; and a blowing agent encapsulated in the polymeric shell, wherein the monomer having an amide group is at least one selected from the group consisting of acryl amide, methacrylamide, N,N-dimethylacrylamide, and N, N-dimethylmethacrylamide.

9. The thermo-expansive microcapsule of claim 1, wherein the polymeric shell contains 1 to 25 weight % of inorganic compounds.

10. The thermo-expansive microcapsule of claim 8, wherein the polymeric shell has a glass transition point (Tg) of 120° C. or higher.

11. The thermo-expansive microcapsule of claim 8, wherein the polymeric shell contains 1 to 25 weight % of inorganic compounds.

12. The thermo-expansive microcapsule of claim 8, which has a maximum expanding temperature of 200° C. or higher.

13. A production process of a foamed and molded product which comprises adding the thermo-expansive microcapsule of claim 8 in rubber or resin to form a mixture and heating the mixture to expand the thermo-expansive microcapsule to introduce discrete air bubbles in the product.

14. A foamed and molded product containing the thermo-expansive microcapsule of claim 8.

15. The thermo-expansive microcapsule according to claim 8, wherein the monomer having a cyclic structure in its side chain is at least one selected from the group consisting of styrene, α-methyl styrene, chlorostyrene, isobornyl(meth) acrylate, cyclohexyl methacrylate, phenyl maleimide, and cyclohexyl maleimide.

16. The thermo-expansive microcapsule according to claim 8, wherein the nitrile monomer is at least one selected from the group consisting of acrylonitrile and methacrylonitrile.

* * * * *